United States Patent

Wechselberger et al.

[11] Patent Number: 5,270,514
[45] Date of Patent: Dec. 14, 1993

[54] METHOD AND APPARATUS FOR FLASH BUTT WELDING RAILWAY RAILS

[75] Inventors: Emmerich E. Wechselberger, Glen Ellyn; Charles R. Battisti, Chicago, both of Ill.

[73] Assignee: Chemetron-Railway Products, Inc., Wheeling, Ill.

[21] Appl. No.: 817,910

[22] Filed: Jan. 8, 1992

[51] Int. Cl.⁵ ............................................. B23K 11/04
[52] U.S. Cl. ..................................... 219/100; 219/55; 219/101
[58] Field of Search .................. 219/97, 100, 101, 104, 219/55

[56] References Cited

U.S. PATENT DOCUMENTS

| | | |
|---|---|---|
| 3,479,480 | 11/1969 | Erwin et al. .......................... 219/97 |
| 3,479,482 | 11/1969 | Erwin et al. .......................... 219/97 |
| 3,681,563 | 8/1972 | Lifshits et al. . |
| 3,925,636 | 12/1975 | Coleman . |
| 4,101,753 | 7/1978 | Buff et al. . |
| 4,103,139 | 7/1978 | Zollinger . |
| 4,208,569 | 6/1980 | Kuchuk-Yatsenko et al. . |
| 4,215,260 | 7/1980 | Zollinger . |
| 4,236,453 | 12/1980 | Cöllen . |
| 4,272,664 | 6/1981 | Theurer . |
| 4,273,984 | 6/1981 | Hara et al. . |
| 4,296,305 | 10/1981 | Lifshits et al. . |
| 4,317,980 | 3/1982 | Goodrich et al. . |
| 4,376,242 | 3/1983 | Buff et al. . |
| 4,414,454 | 11/1983 | Zollinger . |
| 4,415,793 | 11/1983 | Podola et al. . |
| 4,447,700 | 5/1984 | Cohen . |
| 4,471,203 | 9/1984 | Lebedev et al. . |
| 4,484,057 | 11/1984 | Podola et al. . |
| 4,493,040 | 1/1985 | Vanderhelst . |
| 4,555,614 | 11/1985 | Morris et al. . |
| 4,628,176 | 12/1986 | Kojima et al. . |
| 4,645,896 | 2/1987 | Baba et al. . |
| 4,645,897 | 2/1987 | Gourlay et al. . |
| 4,656,328 | 4/1987 | Weldon et al. . |
| 4,717,805 | 1/1988 | Miyagawa . |
| 4,733,044 | 3/1988 | Kuchuk-Yatsenko et al. . |
| 4,734,555 | 3/1988 | Ferguson . |
| 4,861,960 | 8/1989 | Haefner et al. . |
| 4,885,451 | 12/1989 | Farrow et al. . |
| 4,910,375 | 3/1990 | Izume . |
| 4,929,816 | 5/1980 | Theurer et al. . |
| 4,954,686 | 9/1990 | Izume . |
| 4,973,814 | 11/1990 | Kojima et al. . |
| 4,983,801 | 1/1991 | Theurer et al. . |
| 5,018,666 | 5/1991 | Cryderman et al. . |

*Primary Examiner*—Clifford C. Shaw
*Attorney, Agent, or Firm*—Welsh & Katz, Ltd.

[57] ABSTRACT

A welding method and apparatus for flash butt welding adjacent ends of axially aligned railway rails includes a base frame and fixed and movable platens supported on the base frame. The platens support rail sections and are under the control of controller means operative to automatically move the movable platen through a predetermined distance/velocity relation as electrical power is inputted into the rail ends during straight flashing, preheating, flashing and upsetting phases of a welding cycle. The controller includes PID feedback loops operative to maintain the predetermined platen distance/velocity relation with entry of a single parameter by the operator. Significantly improved quality and repeatability of rail welds are obtained.

14 Claims, 5 Drawing Sheets

METHOD AND APPARATUS FOR FLASH BUTT WELDING RAILWAY RAILS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to butt welding railway rails in axially aligned relation, and more particularly to a novel method and apparatus for flash butt welding adjacent ends of axially aligned railway rails which result in substantially improved quality and repeatability of welds.

Welding apparatus for butt welding lengths of railway rails in end-to-end relation to create a relatively long continuous length rail, such as up to approximately one-quarter mile in length, are generally known. See, for example, U.S. Pat. No. 4,103,139. A significant drawback in known apparatus and methods for flash butt welding railway rails is that the quality of the welds is highly operator dependent. As a result, weldments between adjacent ends of different sections of a continuous length rail may vary significantly both as to the quality of weld and the upset distance of the abutting rail ends.

In attempting to assure high quality welds between adjacent sections of rail which make up a longer length continuous rail, the railroad industry is primarily concerned with the amount of heat put into the adjacent rail ends during a weld, and the forging or upset distance which the rail ends undergo during final forging together. To this end, the railroads have set specifications for compliance by the rail manufacturers. These specifications include the forging pressure to be employed for a particular rail chemistry, that is, the particular metallurgical composition of the rails, and the rail transverse cross-section size. The specifications also specify a maximum upset or forging distance range for the rail ends during final forging. These factors (forging pressure and upset or forging distance) dictate the amount of heat which may be put into the rail ends during welding.

Thus, controlling the heat (i.e. electrical power in amp-seconds) put into the ends of the rails during butt welding is critical to meeting the specifications of the railroads. The manner of inputting the welding heat into the adjacent rail ends is equally important so as to prevent burning of the rail end surfaces, the creation of craters or voids in the end surfaces, and/or the formation of oxides which can be captured in the weld. Any of these latter factors can significantly reduce weld integrity and lead to premature failure of the weld joint.

SUMMARY OF THE INVENTION

One of the primary objects of the present invention is to provide a novel method and apparatus for butt welding lengths of railway rail in axially aligned relation which provides consistently high and repeatable weld quality with minimal operator input after the rail ends are clamped and aligned.

A more particular object of the present invention is to provide a novel method and apparatus for flash butt welding lengths of railway rail in axially aligned relation which is operative to automatically carry out highly efficient and repeatable welding through a programmed controller with operator entry of a single parameter related to the rail transverse cross-section and the chemistry of the rails.

Another object of the present invention is to provide a novel method and apparatus for flash butt welding juxtaposed ends of railway rails wherein a straight flashing phase of the welding method is automatically initiated by controller means which closes the gap between the rail ends until a current flow is detected at which time a straight flashing distance is summed to the exact position of the rails and a straight flashing distance limit is set, thereby automatically compensating for any variation in air gap between rail ends caused by the operator during clamping and aligning of the rails in the welding apparatus, and establishing highly accurate repeatability in the relative distance traversed by the rails during straight flashing of successive weldments.

A further object of the present invention is to provide a novel method and apparatus for flash butt welding lengths of railway rails in axially aligned relation wherein the amount of electrical power used during a weld cycle is controlled automatically so that a predetermined total power input is reduced by the amount of power used in the straight flashing phase, and the number and duration of counts or pulses utilized in the preheat phase are continually adjusted so that the power inputted to the rail ends during each successive pulse represents the quotient of the remaining power divided by the remaining number of pulses.

Another object of the present invention is to provide a novel method and apparatus for flash butt welding lengths of railway rails in axially aligned relation wherein any material on the rail ends which is distorted or burned away is accounted for in controlling the gap closing at the initiation of a final flashing phase following the preheat phase.

A feature of the method and apparatus for flash butt welding juxtaposed ends of railway rails in accordance with the present invention lies in controlling the velocity of relative movement between the rail ends during straight flashing by a programmed closed loop feedback control which is distance/velocity dependent.

Another feature of the method and apparatus for flash butt welding juxtaposed ends of railway rails in accordance with the invention lies in automatically controlling the relative distance traversed by the rail ends during the final flash phase such that the distance traversed is highly repeatable between welds regardless of setup and welding conditions.

Still another feature of the rail butt-welding method and apparatus of the present invention lies in controlling the relative velocity between juxtaposed rail ends during the final flash phase through a programmed closed loop feedback control which is distance/velocity dependent.

Further objects, features and advantages of the present invention, together with the organization and manner of operation thereof, will become apparent from the following detailed description of the invention taken in conjunction with the accompanying drawings wherein like reference numerals designate like elements throughout the several views.

DETAILED DESCRIPTION

Figure 1:
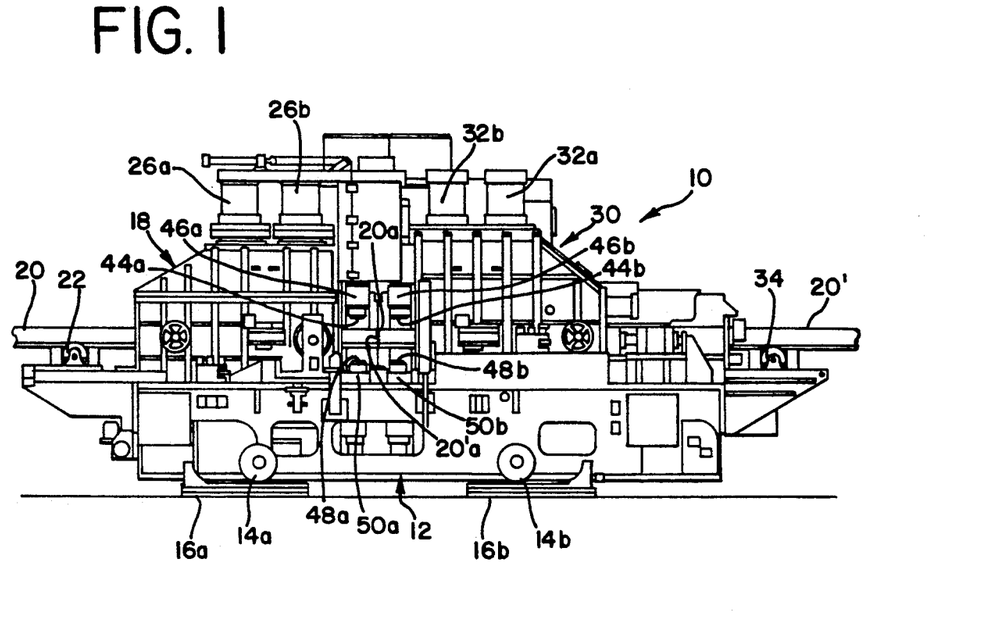
FIG. 1 is an elevational view of an apparatus for flash butt welding lengths of railway rail in accordance with the present invention.

Referring now to the drawings, and in particular to FIG. 1, a welding apparatus for flash butt welding lengths of railway rail in axially aligned relation in accordance with the present invention is indicated generally at 10. The welding apparatus 10, which may alternatively be termed a welding machine, is of generally known construction such as commercially available from Chemetron-Railway Products, Inc., Wheeling, Ill.

Briefly, the welding apparatus includes a base frame 12 having pairs of wheels, two of which are indicated at 14a and 14b, which enable the welding apparatus to be supported on support rails, such as shown at 16a and 16b, for limited longitudinal movement while disposed at a generally fixed location. A fixed platen 18 is supported on the left-hand or exit end of the base frame 12 and serves to receive and support a continuous length rail, a portion of which is indicated at 20, on guide rollers, one of which is shown at 22, such that the rail extends generally centrally through the fixed platen. A pair of clamping cylinders, such as hydraulic or pneumatic cylinders 26a and 26b, are supported on the fixed platen 18 and have selectively extendable pistons and clamping shoes (not shown) operative to clamp the rail section 20 in fixed relation within the fixed platen 18 with a clamping force of up to 100 tons per clamping cylinder, as is known.

A movable platen 30 is supported on the right-hand or entry end of the base frame 12. The platen 30 is movable longitudinally along the base frame on suitable guide ways (not shown) and is operative to receive and support a length of rail 20' for butt welding an end surface 20'a on rail 20' to an opposed end surface 20a on the trailing end of rail 20. The movable platen carries a pair of clamping cylinders 32a and 32b which are similar to the clamping cylinders 26a,b and have extendable piston rods and clamping shoes (not shown) selectively operable to clamp the rail 20' to the movable platen 30 with a clamping force up to approximately 100 tons per clamp. Generally, the rail sections to be butt welded together, such as rail 20', are made up to 80 feet in length and may weigh approximately 4,000 pounds. Rails up to one-quarter mile in length are formed by joining adjacent end surfaces of axially aligned sections together. Each successive individual rail section to be welded to the previously welded continuous length rail must be properly located in the welding apparatus to prepare it for butt welding to the trailing end of the continuous length rail, such as 20. Generally, the individual rail sections are lifted one at a time onto power driven rollers operative to feed successive rail sections into the movable platen 30 after which the rail is axially aligned with the exiting continuous rail and clamped in fixed position to the movable platen. To this end, the movable platen carries guide rollers, one of which is indicated at 34, and horizontal clamping and adjustment means which cooperate with the clamping cylinders to fix the new rail section in proper alignment with the previously welded continuous 12 rail length.

Figure 2:
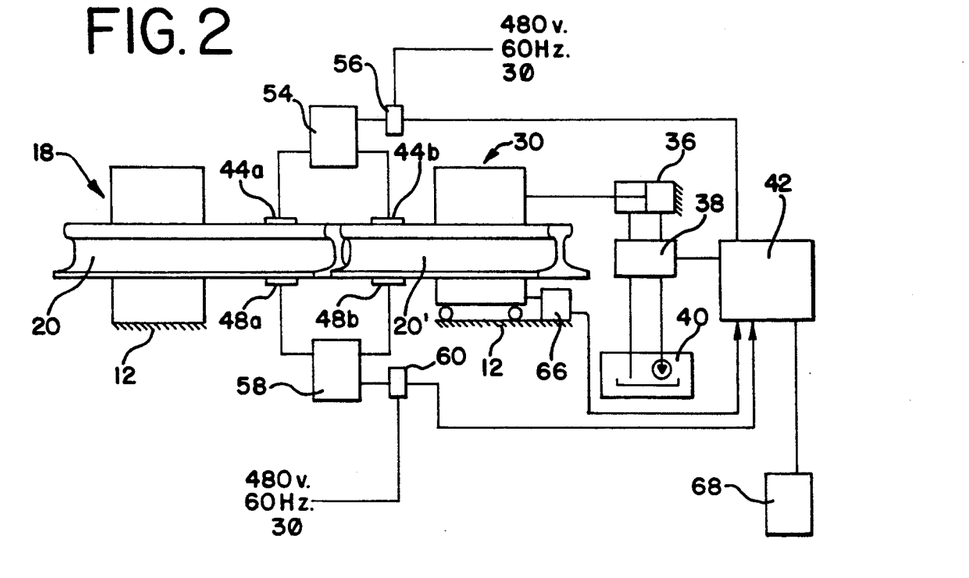
FIG. 2 is a schematic diagram illustrating the various components employed in the welding apparatus of FIG. 1 and the associated control for effecting flash butt welding in accordance with the present invention.

One or more platen motion cylinders, indicated schematically at 36 in FIG. 2, in the form of hydraulic cylinders or rams are interconnected between the base frame 12 and the movable platen 30 to enable selective highly accurate movement of the movable platen, and thereby the rail end 20'a, relative to the base frame and fixed platen 18. Such platen motion cylinders are well known in the art and may be connected through a common hydraulic control valve, indicated schematically at 38 in FIG. 2, to a suitable hydraulic power supply and reservoir 40 of known design. The control valve 38 enables relative precise forward and rearward movement of the movable platen relative to the fixed platen. The hydraulic control valve is selectively operable to control the volume of fluid delivered to the platen motion cylinders and thereby control the velocity of the rail section 20' relative to the continuous rail section 20. After initially positioning and clamping a rail section 20' within the movable platen 30, the operator may manually actuate the platen motion cylinder control valve 38 to bring the mutually opposed rail ends 20a and 20'a into relatively close but spaced apart relation. As will be described, the platen motion cylinder control valve 38 is connected to and subsequently comes under the control of controller means in the form of a process controller 42 (FIG. 2) operative to carry out a welding cycle automatically without further operator input or control.

Referring to FIG. 2, the rail sections 20 and 20' are schematically illustrated as fixed within the fixed platen 18 and the movable platen 30, respectively. It will be understood that preparatory to positioning each successive rail section within the movable platen 30, upper and lower surface areas on the rail head and base flange adjacent the opposite ends are cleaned, as by grinding and/or wire brushing, to remove any scale and the like and thereby prepare the surfaces for good electrical contact with the contact electrodes on current transformers.

As illustrated in FIG. 1, a pair of upper adjustable electrode contacts 44a and 44b are carried by associated electrode supports 46a and 46b which in turn are supported by the fixed and movable platens 18 and 30. The electrode contacts 44a and 44b are adapted to contact the upper surfaces of the fixed and movable rail sections 20 and 20' adjacent their respective end surfaces 20a and 20'a.

Similarly, a pair of lower vertically adjustable electrode contacts 48a and 48b are carried by respective lower electrode supports 50a and 50b supported by the fixed and movable platens 18 and 30. The electrode contacts 48a and 48b are similarly adapted to contact the lower surfaces of the base flanges of the fixed and movable rail sections 20 and 20'.

Referring again to FIG. 2, the upper electrode contacts 44a and 44b are connected to an upper welding power supply, indicated schematically at 54, which is connected to an upper welding power supply current transformer 56. The current transformer 56 is connected to a 480 v.a.c., 60 Hz three-phase power supply and to the process controller 42. The lower electrode contacts 48a and 48b are connected to a lower welding power supply 58 which is connected to a lower welding power supply current transformer 60. The lower current transformer 60 is also connected to a 480 v.a.c., 60 Hz three-phase power supply and to the process controller 42.

A platen position and velocity transducer, indicated schematically at 66 in FIG. 2, in the form of a linear velocity displacement transducer (LVDT) is interconnected between the base frame 12 and movable platen 30 of the welding apparatus 10. The LVDT is operative to produce an output signal to the controller 42 in the range of 0–10 volts as a function of the exact position of the movable platen relative to the base frame. The movable platen may have a stroke of 5 inches, although a greater or smaller stroke may be utilized if desired. The LVDT signal indicates exactly where the movable plate 30 is relative to its permissable stroke distance.

An operator interface 68 of known design allows the operator to initiate fully automatic operation of the welding apparatus 10 after fixing the rail sections 20 and 20' in axially aligned relation with their opposed ends being spaced apart approximately ½ inch or so. The interface 68 initiates operation of the controller 42 and allows the operator to enter a single parameter into the controller 42 indicating the total power (and thus heat) to be put into the rail ends during a welding cycle. The selected power is in turn a function of the rail cross-sectional size and chemistry, and may be set to a predetermined magnitude for each different rail size and chemistry. This results in a significant increase in the quality and repeatability of production rail welding since a uniform amount of power is used in each weld cycle. The method of rail welding in accordance with the invention is particularly suited for alloyed and head-hardened rails since the resulting microstructure in the heat effected zone is dependent upon the cooling rate of the weld. Because a constant amount of power (heat) is used in each weld cycle, the cooling rate is predictable.

The current transformers 56 and 60 transform the 480 v.a.c. power supply to a lower a.c. voltage which is put through a full-wave rectifier bar and applied to the corresponding welding power supplies 54 and 58 so as to apply a substantially constant 11.7 v.d.c. power to the electrode contacts 44a,b, and 48a,b.

By selective phase shifting of the power applied to the primary sides of the transformers 56 and 60, the amount of current applied to the transformers can be controlled, and thus the amount of current which can be delivered by or is available from the secondary sides of the transformers can be controlled as a direct current.

The controller 42 is of the type such as commercially available from Allen Bradley Company, Milwaukee, Wis. The controller 42 includes a proportional integral derivative (PID) feedback control loop and is programmed in accordance with the program printout attached hereto as Appendix "A" and forming a part hereof. The program is programmed in Boolean logic and printed out in a ladder logic format. Pages 28 to 34 of Appendix A show the program used during the power integration portion of a welding cycle using the PID loop control; namely, the straight flashing and preheat phases of the welding cycle.

Figure 4A:
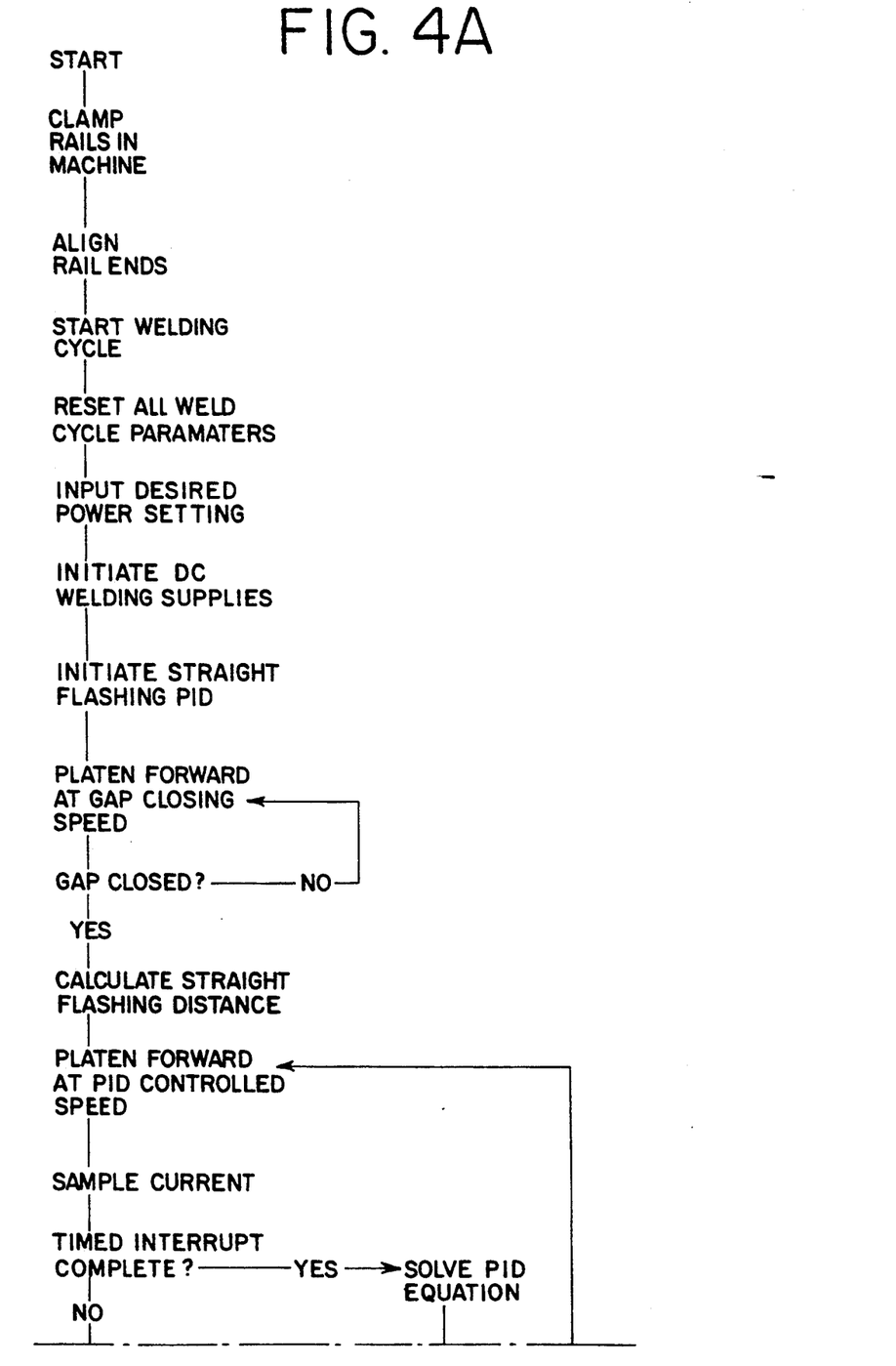
FIGS. 4(A)-4(C) are flow charts illustrating the operation of the rail welding apparatus of FIG. 1 in accordance with the controller, including the proportional-integral-derivative (PID) feedback control loops in the programmed controller.
Figure 4B:
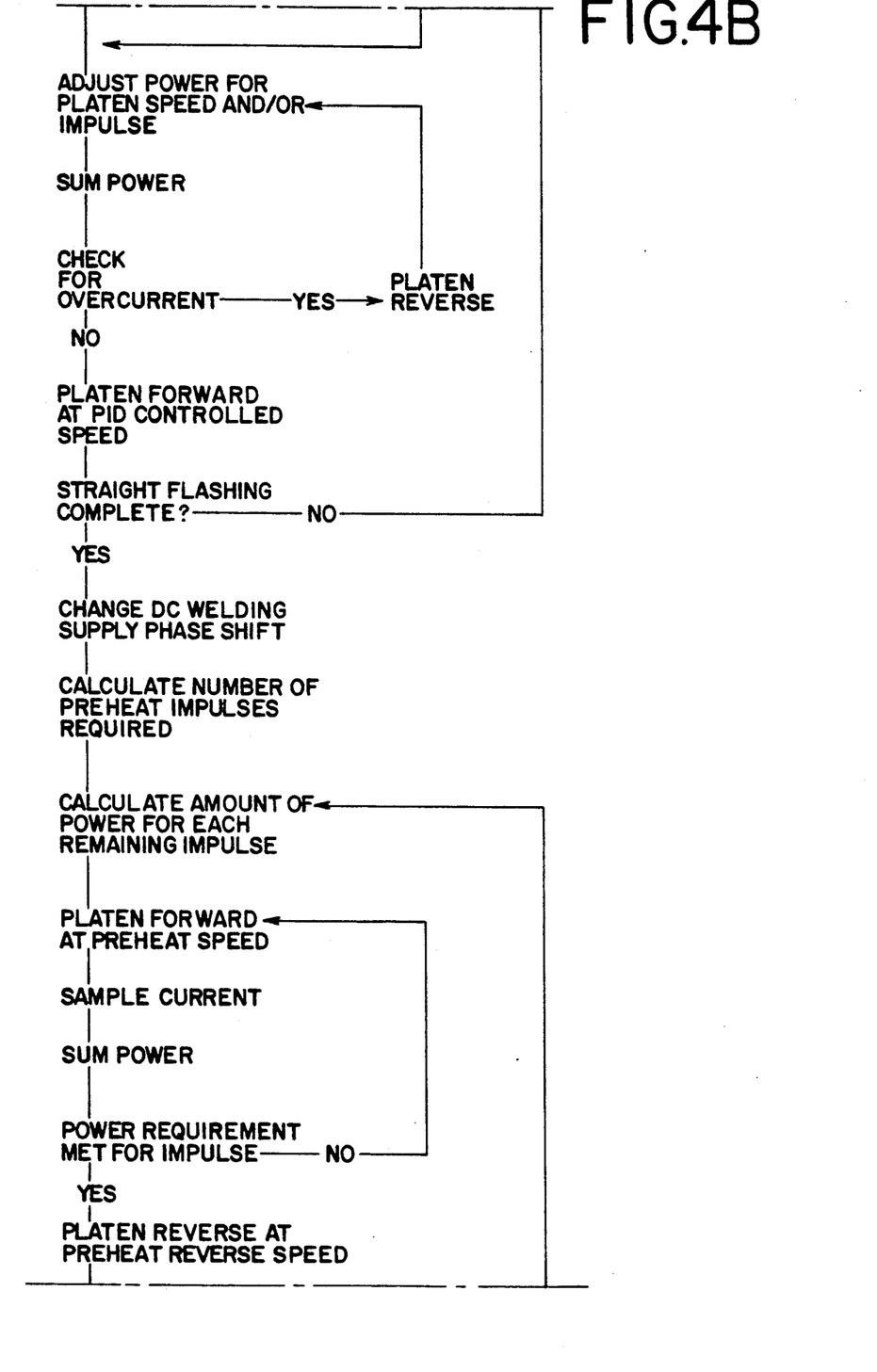
Figure 4C:
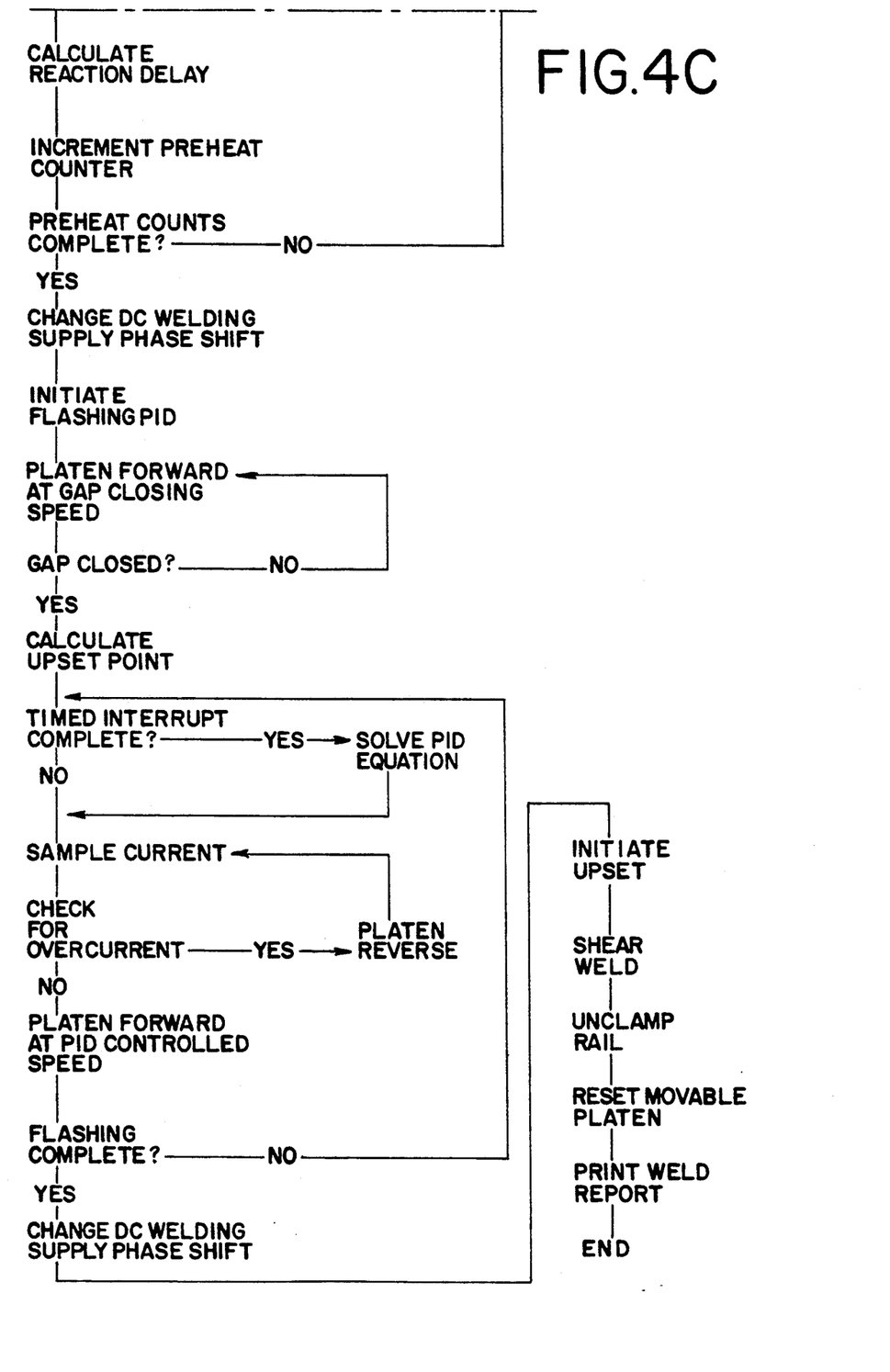

FIG. 4 is a detailed flow chart for the operation of the controller 42, with the various steps shown in flow diagram format. In carrying out the step of clamping the rails in the fixed and movable platens of the welding machine, the operator centers the rail joint in the welder and initiates the clamp sequence. The operator then aligns the rail ends such that welding tolerances will be met. The operator then initiates a welding cycle. No further operator input is required. The programmed computer initiates all welding variable, and samples desired power input for this weld cycle. The DC welding supplies are energized and brought to the straight flash phase shift.

At the step of initiating the straight flashing PID, the straight flashing PID variables are selected and the timed interrupt is enabled. The platen forward gap closing speed is controlled by the PID equation which is set at the straight flashing gap closing speed. The welding current is then sampled for initial current draw. If the gap is properly closed, the computer sums the straight flashing distance to the gap closed point. The movable platen is now moved forward with the platen forward speed under PID control. Speed is proportional to welding current and position. The computer then samples the current to update the welding current.

If the PID timed interval is complete, the computer then solves the control equation. Welding current and platen position are sampled and platen speed is updated. The sampled power is adjusted for platen speed and/or overcurrent draw. The power is then summed by adding the adjusted power to the total power used in this weld cycle. The system then makes a check for "freezing" or "sticking" of the rail ends. If no sticking is detected, the platen forward speed is returned to PID control. A check is then made to see if the movable platen position matches the straight flashing distance limit. The time interrupt is disabled. If the straight flashing step is complete, the DC welding supply is adjusted to the preheat cycle phase shift. The number of preheat impulses required from the remaining power to be used during this weld cycle is then calculated.

From the remaining amount of power to be used during this weld cycle and the remaining number of preheat impulses, the amount of power for each remaining phase is calculated. The movable platen is then moved forward with platen forward speed set to the preheat forward speed. An update of the welding current is then made. The power is then summed and the unadjusted power is added to the total power used during this weld cycle. A check is then made to determine if the complete preheat impulse power requirement has been met. If it has, the preheat impulsing is complete, and the movable platen reverses at preheat reverse speed. The reaction delay between the preheat reverse point and interruption in welding current is then calculated by an increment preheat counter. A check is then made of the preheat counter against the calculated preheat counts to see if the preheat counts are complete. If the preheat counts are complete, the DC welding supply flashing cycle phase shift is adjusted.

Next, the flashing PID variable are selected and the timed interrupt is enabled. The PID equation is then set to the flashing gap closing speed and the movable platen is moved forward at the gap closing speed. The welding current is then sampled for initial current draw to determine if the gap between rail ends is closed. If so, the total flashing distance is summed to the gap closing point. If the PID timed interval is complete, then the computer solves the control equation. Welding current and platen position are sampled and platen speed is updated. The welding current is again sampled and updated. A check for "freezing" or "sticking" of the rail ends is made to determine if there has been an overcurrent. If so, the movable platen is reversed. If not, the platen is moved forward with the platen forward speed under PID control. Speed is proportional to welding current and position. A check is made to determine if plate position matches the calculated upset point. Timed interrupt is disabled. If the platen position matches the calculated upset point, the DC welding supply upset cycle phase shift is adjusted.

At this point upset is initiated. The weld is forged together and held at preset upset force for the preset holding time. The electrodes are then unclamped and the upset burr is sheared off. The remaining machine clamps are then released, and the movable platen is reversed to its initial position for the next weld cycle. A print weld report is then made wherein the weld parameters are printed for a record.

Summarizing, the main components of the railwelding power integration system (aside from the flash butt welding machine itself) include the process controller 42, the operator interface 68, the upper welding power supply current transformer 54, the lower welding power supply current transformer 58, the platen position transducer 66, and the platen velocity transducer (part of the platen position transducer).

The railwelding process can be divided into five distinct phases: the first phase is a straight flashing phase during which the rail ends are burned even in order to eliminate any mill irregularities, surface rust, uneven saw cuts (such as on second hand rail or rewelds), and any accumulated grease and grime. This insures that preheating will occur evenly over the entire surface area of the rail section.

Straight flashing is followed by a preheating phase which accomplishes the main heating of the rail ends. The preheating phase applies multiple power impulses each of which is preferably 3–3½ seconds or less to help eliminate electrode burns and provide a lower duty cycle for the welding power supplies. The rail ends are split apart between impulses so that premature welding (spot welding) is avoided. This "make and break" also helps in forming a more uniform heat affected zone across the rail section. The amount of power used during preheating can be controlled by the number and duration of preheats, and the amount of current delivered to the rail ends during preheating (phase shifting of the welding power supplies).

Preheating is followed by a final flashing phase during which the rail ends are burned off at a progressive rate to eliminate oxide inclusions and any cratering that has developed during the previous phases. The flashing rate is accelerated well past the point where more heat is dissipated from the weld in metal splash than is left as residual heat.

The final flashing phase is followed by an upsetting or forging phase during which the rail ends are forged together with a pressure greater than 7000 psi, and preferably about 9000 psi, depending upon the chemistry of the steel being welded. The rail ends are forged together to the point of refusal, not to a fixed distance such as a limit switch point. After upsetting, a postheating or air quench phase may take place if special treatment of alloy and headhardened rails is necessary.

The power integration under control of the PID is in operation only during the first two phases of welding, that is, straight flashing and preheating, since these insure the heat affected zone to be even and uniform throughout the rail section. The flashing and upset phases can be considered constants since the flashing distance, flashing rate, upset force, and the upset power are fixed values.

As aforedescribed, the operator interface 68 allows a present power value, such as approximately 560K amp-seconds of power, to be entered into the process controller 42. This represents the target power input during the welding cycle which will vary for different rail sections and chemistry. The process controller 42 uses feedback from the upper welding power supply current transformer 54, the lower welding power supply current transformer 58, and the platen position and velocity transducer 66 to calculate the total power used during straight flashing and preheating. The total power is equal to the sum of the straight flashing power and the preheat power.

After the rail ends are clamped and aligned in the machine, the operator initiates the welding cycle. The process controller 42 then steps through the welding cycle with no further operator input. The welding machine will consistently repeat the welding cycle regardless of which operator is on duty, and a highly repeatable weld quality is achieved.

At the initiation of the welding cycle, the straight flashing PID closed loop control is enabled. The movable platen 30 closes the gap between the rail ends at a high velocity until a current draw is detected from either the upper or lower welding power supply current transformers 54 and 58, respectively. At that point the straight flashing distance is summed to the present platen position. This will serve to set up the straight flashing distance limit, such as 0.25 inch. Immediately upon the first detection of current draw, the platen reverses until no current is sensed. This results in a number of advantages. For example, any air gap between the rail ends left by the operator during clamping and aligning will be automatically accounted for. Also, a consistent straight flashing distance is obtained.

The platen velocity during straight flashing is determined by the PID closed loop control equation. The welding current is compared to a straight flashing distance-platen velocity set of values and the difference is amplified and applied to the hydraulic control valve 38. The hydraulic control valve 38 controls the volume of fluid delivered to the platen motion cylinders 36 and therefore determines the platen velocity. At the beginning of the straight flashing cycle a very slow platen velocity is required since there is no substantial residual heat build up in the rail ends to sustain flashing. As the rail ends are burned away and residual heat increases, the platen velocity may be increased. The result is an accelerated or parabolic platen velocity that teaches or adapts itself to any particular rail section and chemistry. This results in a minimum of time to burn off the preset distance. Also, a minimum of freezing or sticking of the rail ends results (wherein the rail ends actually form a spot weld or a weld nugget and must be broken apart). This prevents hot spots that can result in an uneven heat affected zone. Further, a reduction in cratering due to the increase in platen velocity (and therefore current density on the rail surfaces) results. At the completion of straight flashing, the rail ends have a smooth slightly plastic surface so that the preheat power will be distributed evenly over the entire rail section resulting in a uniform heat affected zone. No parameter adjustments need to be made when changing rail section and/or chemistry.

The total straight flashing power is equal to the sum of the power dropped as residual heat in the rail ends at the completion of straight flashing (used in the integration calculations), and the power required to melt and eject steel particles while burning the rail ends even (disregarded in the integration calculations). To determine the straight flashing power dropped as residual heat, the process controller sums the power dropped during straight flashing proportional to the platen velocity, and the power dropped during heavy current draw or "freezing" of the rail ends. A certain platen velocity during flashing sets up an equilibrium where the power dropped as residual heat is equal to the power required to melt and eject the steel particles. A lower platen velocity will result in more power dropped as residual heat. A higher platen velocity will result in heat loss to ejected steel particles.

Figures 3A, 3B:
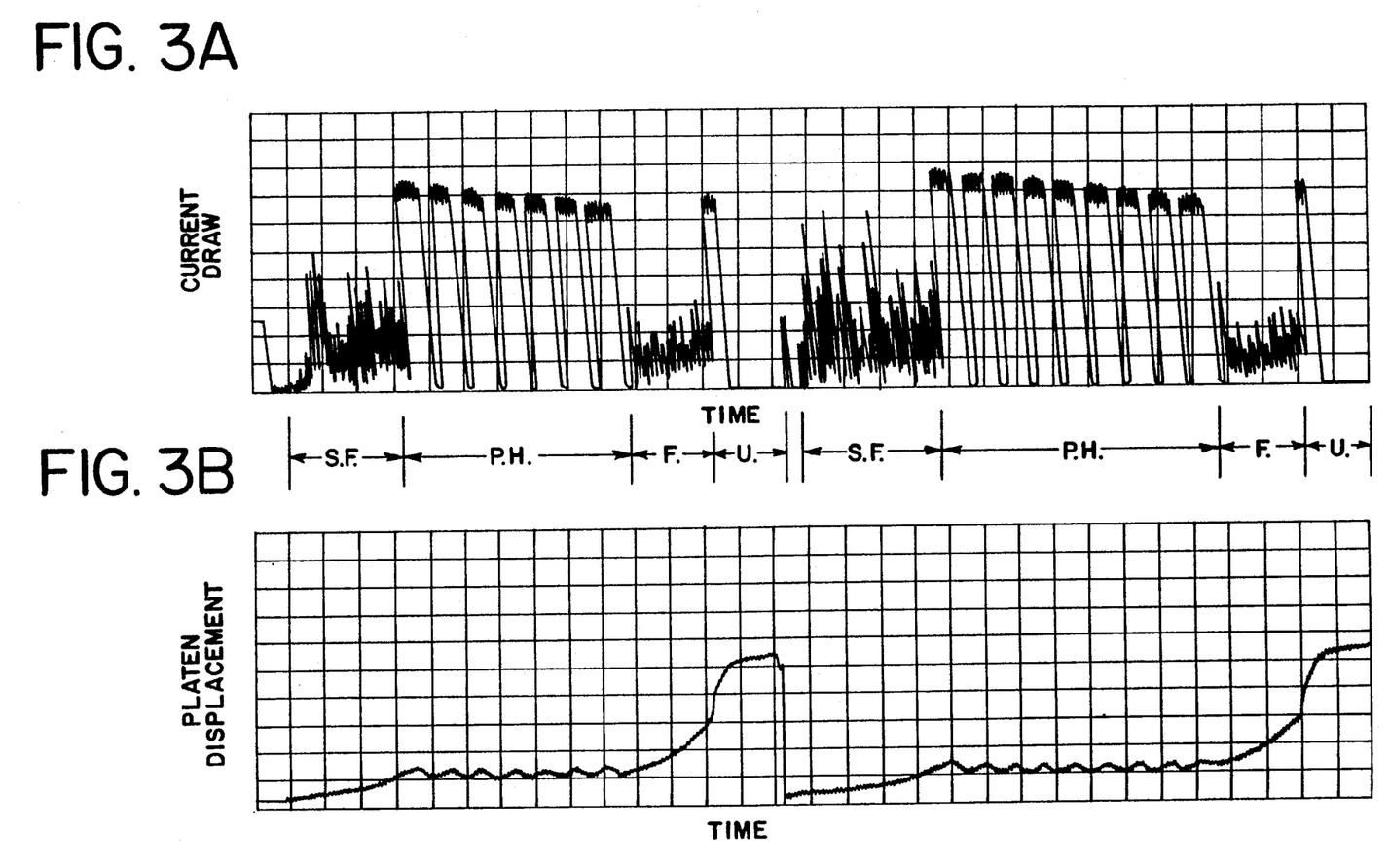
FIG. 3A is a strip chart showing the relation of welding current to time during welding cycles in accordance with the present invention.
FIG. 3B illustrates a strip chart showing displacement or movement of the movable rail support platen versus time in relation to the current and time curves shown in FIG. 3A.

A typical pattern of current draw between the rail ends 20a and 20'a during straight flashing, and the displacement of the movable platen 30 in relation to time are illustrated on the strip charts illustrated in FIGS. 3A and 3B. The portion of the strip charts represented by the symbol "S.F." shows the fluctuation in current draw as the platen 30 is moved toward the fixed platen 18 at a progressively increasing velocity (i.e. acceleration) over a straight flashing distance of approximately ¼ inch. Each horizontal line on the chart of FIG. 3B represents a platen movement of ¼ inch, while the distance between vertical lines represents a time span of 5 seconds.

For all practical purposes, during the preheating phase, the entire preheat power (preset power minus the straight flashing power) is dropped as residual heat in the rail ends since little or no flashing occurs. The remaining power is equal to the preset power minus the straight flashing power dropped in To control the amount of preheat power dropped in the rail ends, the process controller 42 performs the following calculations:

(1) During the interval between straight flashing and preheating, the preheat power is divided by an "ideal impulse power" to determine the number of impulses required to reach the preset power setpoint.

(2) Before each impulse (except for the final impulse), the remaining power is divided by the remaining number of impulses to determine the desired amount of power to drop during that impulse. This corrects the preheat impulse length dynamically (or "on the fly") rather than allowing the final impulse to carry the weight of the accumulated error from the entire impulse phase. This results in a more time-wise uniform set of impulses.

(3) During each impulse, the process controller 42 sums the power drop during that impulse with the total power already dropped during the weld cycle.

(4) At the end of each impulse (except for the final), the process controller 42 calculates the platen reaction delay. This is the inherent mechanical delay between when the platen starts to reverse from an impulse and when the rail ends actually break. The result is used in the next impulse to accurately obtain the desired input length. In this manner the machine teaches or adapts itself to any particular rail section and chemistry without the need for parameter adjustments.

(5) The desired amount of power to drop during the final impulse is equal to the remaining power, and will be slightly different from the previous impulses since any remaining error will be accounted for here.

A graph representation of the current draw during each preheat impulse during two different welding cycles is shown in FIG. 3A by the symbol "P.H.", with the corresponding movement or displacement of the movable platen 30 being shown immediately below in FIG. 3B. There are seven preheat impulses in the first weld cycle which is typical of a re-welding operation. The second weld cycle depicted shows eight preheat impulses.

After the final preheat, the movable platen 30 closes the gap between the rail ends 20 and 20'a at a high velocity until a current draw is detected from either the upper or lower welding power supply current transformers 54 and 58. At that point the flashing distance is summed to the present platen position to set up the initial flashing distance limit, the progressive flashing distance limit and the upset limit. The flashing PID closed loop control equation is then initiated. This procedure enables any appreciable length of the rail ends that is either distorted or burned away during preheating to be accounted for. This will vary from cycle to cycle. Another advantage is that a consistent flashing distance is obtained.

The platen velocity during flashing is determined by a PID closed loop control equation. The welding current is compared to a flashing distance-platen velocity set of values and the difference is amplified and applied to the hydraulic control valve 38. The hydraulic control valve controls the volume of fluid delivered to the platen motion cylinders 36, and therefore controls the platen velocity.

As final flashing is initiated, the platen velocity is slow to eliminate any jagged ends left from the preheating phase. The platen velocity will then increase parabolically to the upset point. The result is an accelerated platen velocity that teaches or adapts itself to any particular rail section and chemistry. This offers a number of advantages as follows:

(1) A minimum of time to burn off the present distance.

(2) A large reduction in cratering due to the continuous increase in platen velocity (and therefore a continuous increase in current density on the rail surfaces). This results in a very smooth, virtually crater free rail surface prior to upset.

(3) A very vigorous, aggressive flashing that protects the molten rail faces from oxidation. This greatly reduces the chances for oxide inclusions.

(4) No parameter adjustment when changing rail section and/or chemistry.

The current draw and displacement or velocity curve for the movable platen 30 during the flashing phase immediately prior to upsetting or forging of the rail ends together is depicted in FIGS. 3A and 3B by the symbol "F". It is seen that the platen 30 undergoes significant acceleration during the flashing phase in which the platen moves through a distance of approximately 9/16 inch in a continuous motion.

Following final flashing, the rail ends are forced together under a pressure of approximately 9000 psi to a point of refusal, that is, until the rails are no longer yieldable under the axial forging pressure. The upsetting or forging phase is represented in the graphs of FIGS. 3A and 3B by the symbol "U".

Having thus described the welding apparatus 10 and the method by which it effects flash butt welding of adjacent ends of lengths of railway rail, it will be appreciated that high quality welds may be repeatably obtained in production rail welding. Simplicity of operator input has been accounted for since only one parameter, namely the total power (heat) to be put into the rail ends, is inputted to the controller 42 through the operator interface 68. Since a constant amount of power (or heat) is used in each weld cycle, the cooling rate for each weld is predictable. This makes the welding method of the present invention particularly suitable for alloyed and head-hardened rails.

While a preferred embodiment of the rail welding apparatus and method for using same have been illustrated and described, it will be understood that changes and modifications may be made therein without departing from the invention in its broader aspects. Various features of the invention are defined in the following claims.

What is claimed is:

1. A method for straight flashing adjacent ends of a pair of railway rails to prepare the adjacent rail ends for weld joining, said method comprising the steps of;

securing the rails in generally longitudinally aligned relation for relative longitudinal movement therebetween, applying electrical power to said adjacent rail ends while simultaneously effecting relative closing movement between said rail ends through actuating means so as to bring said rail ends into position to effect current flow between the rail ends, and causing a feedback signal to be applied to said actuating means to automatically vary the rate of relative movement between said rail ends proportional to the current flow between said rail ends and in a manner to maintain a predetermined distance/velocity relative between said rail ends when moved relative to each other.

2. The method as defined in claim 1 wherein said actuating means is controlled by a proportional integral derivative feedback control loop operative to effect relative high velocity movement between said adjacent rail ends toward each other until said current flow between said rail ends is effected.

3. The method of claim 2 wherein said control loop is operative to reverse the relative movement between said rails when current flow between said rail ends is first detected, said control loop being further operative to establish a straight flashing distance limit in response to said first detection of current flow between said rail ends.

4. The method of claim 3 wherein said control loop is operative to effect a slow initial velocity between said rail ends until said current flow is detected, and effect a progressively increasing relative velocity between said rail ends toward each other during said straight flashing cycle.

5. The method of claim 4 wherein said control loop is operative to effect said progressively increasing relative velocity between said rail ends in response to a feedback signal proportional to the current flow between said rail ends during straight flashing.

6. A method for preparing adjacent ends of elongated railroad rails for flash butt-welding said adjacent ends, said rails having generally similar transverse cross-sectional configurations and similar metallurgical compositions, said method comprising the steps of;

positioning said rails in predetermined generally axially aligned relation so that end faces of the rails to be welded together are in mutually opposed spaced relation and are movable relative to each other to selectively vary the distance therebetween, applying electrical power to the rails adjacent their mutually opposed end faces and simultaneously moving said adjacent end faces toward each other at a relatively slow velocity while monitoring electrical current flow between said opposed end faces, and stopping said relative movement of said rails toward each other when a current flow is detected between said end faces, determining the positions of said adjacent rail ends at the moment of said current flow in relation to their range of relative longitudinal movement, applying a signal to a process controller representative of the relative positions of said rail ends when said initial current flow is detected, said process controller being operative to establish a straight flashing distance for traverse by said rail ends, moving said rail ends away from each other immediately after said current flow is detected until no electrical flow is detected between said end faces, and thereafter effecting automatic relative movement of said rail ends toward each other under the control of said process controller in accordance with a predetermined distance/velocity relation while effecting current flashing therebetween until said rail ends have traversed said straight flashing distance toward each other.

7. A system for flash butt-welding adjacent ends of generally elongated railway rails having substantially similar transverse cross-sectional configurations and metallurgical compositions, said system comprising, in combination;

first support means for fixedly supporting a first one of said rails, second support means for supporting the other of said rails such that an end surface thereof is mutually opposed to an end surface on said first rail and is movable relative thereof, and controller means for effecting movement of said rail end surfaces toward each other in accordance with a predetermined distance/velocity relation determined by the rail cross-section and chemistry, said controller means being operative in response to feedback signals corresponding to the relative positions of said rails to apply a predetermined amount of electrical power to said rail ends sufficient to effect straight flashing and preheating of said rail ends.

8. A method for butt welding adjacent ends of a pair of railway rails supported in axially aligned relation, at least one of the rails being supported on a movable platen having means associated therewith for moving the corresponding rail longitudinally at a controlled velocity relative to the other rail so as to selectively adjust the spacing between the adjacent rail ends, said method comprising the steps of;

(a) straight flashing the adjacent ends of the rails to create substantially planar mutually opposed end surfaces, (b) preheating said adjacent end surfaces by applying intermittent electrical power pulses to said end surfaces, (c) final flashing said adjacent end surfaces in a manner to eliminate oxide inclusions and craters therein, and (d) forging said opposed end surfaces together under a predetermined pressure to the point of refusal, said steps of straight flashing and preheating including applying a predetermined total electrical power to the opposed end surfaces by controller means, said controller means being operative to apply a first portion of said predetermined power during straight flashing and apply the remainder of said power to said ends in intermittent pulses during said preheating, said controller being operative to initially divide said remainder power into a predetermined number of substantially equal power pulses and apply a first of said pulses to said rail ends, said controller means being further operative to sum the power actually applied during said first pulse, subtract said actually applied power from said remainder power to create a second remainder power, divide said second remainder power by the remaining of said predetermined pulses to establish a substantially equal number of remainder power pulses, apply a first of said remainder power pulses to said adjacent rail ends, sum the actual power applied during said first remainder pulse and subtract it from said second remainder power to establish a third remainder power, divide said third remainder power by the remainder of predetermined pulses to establish a substantially equal number of further remainder pulse, apply a first of said further remainder pulses to said rail ends, sum the actual power applied during said first further remainder pulses and subtract it from said third remainder power to establish a fourth remainder power, and continue summing the actual power applied to said rail ends during each successive power pulse, subtract it from the remainder of said predetermined power to be applied, divide the balance by the remainder of said predetermined pulses, and apply the quotient power to the rail ends for a predetermined period of time, until all of said remainder power has been applied to said rail ends during said predetermined preheat pulses.

9. The method as defined in claim 8, wherein said controller means is operative to automatically space said adjacent rail ends an initial predetermined distance apart, and effect relative movement of said rail ends toward each other in accordance with a predetermined distance/velocity relation so as to apply a predetermined electrical power to said ends as they traverse said predetermined distance substantially in accordance with said distance/velocity relation.

10. The method as defined in claim 9 wherein said controller means includes a proportional integral and derivative feedback control operative to control said straight flashing and preheat steps.

11. The method as defined in claim 9 wherein said controller means is operative to effect contact between said adjacent rail ends during each of said preheat pulses, and separate said rail ends at the end of each pulse.

12. The method as defined in claim 8 wherein said adjacent rail ends are spaced apart with substantially zero current flow therebetween after the last of said preheat pulses, said step of final flashing said adjacent end surfaces including effecting relative movement of said adjacent end surfaces toward each other at a relatively high velocity until current flow is established between said end surfaces, and determining the distance between said adjacent end surfaces when said current flow is established therebetween, said controller means being operative to effect predetermined relative movement between said adjacent rail ends in accordance with a predetermined closed loop equation.

13. The method of claim 12 wherein said controller means is operative in response to current flow between said adjacent end surfaces during final flashing to establish relative movement between said end surfaces in accordance with a predetermined flashing-distance platen-velocity relation.

14. The method of claim 13 wherein said controller means is operative to effect relatively slow movement of said adjacent end surfaces toward each other during initiation of said final flashing step, and thereafter effecting progressively increasing velocity closing of said end surfaces.

* * * * *

UNITED STATES PATENT AND TRADEMARK OFFICE
CERTIFICATE OF CORRECTION

PATENT NO.   : 5,270,514
DATED        : December 14, 1993
INVENTOR(S)  : Wechselberger et al.

It is certified that error appears in the above-indentified patent and that said Letters Patent is hereby corrected as shown below:

Column 6, line 9 "variable" should read --variables--.
Column 11, line 43, "relative" should read --relation--.

Signed and Sealed this

Eighteenth Day of February, 1997

Attest:

BRUCE LEHMAN

Attesting Officer   Commissioner of Patents and Trademarks